Oct. 3, 1939. J. WHITING ET AL Re. 21,229

CONTAINER

Original Filed May 19, 1921 2 Sheets-Sheet 1

Inventors
Jasper Whiting & Philip Wadsworth
By J. H. McCurdy
their Attorney

Oct. 3, 1939. J. WHITING ET AL Re. 21,229

CONTAINER

Original Filed May 19, 1921 2 Sheets-Sheet 2

Inventors
Jasper Whiting & Philip Wadsworth
By J. H. McCurdy
their Attorney

Reissued Oct. 3, 1939

Re. 21,229

UNITED STATES PATENT OFFICE 21,229

CONTAINER

Jasper Whiting, Dublin, N. H., and Philip Wadsworth, Boston, Mass., assignors to Container Patents Corporation, New York, N. Y., a corporation of New York Original No. 1,469,567, dated October 2, 1923, Serial No. 470,858, May 19, 1921. Application for reissue June 24, 1939, Serial No. 280,950

9 Claims. (Cl. 220—29)

Figure 1:
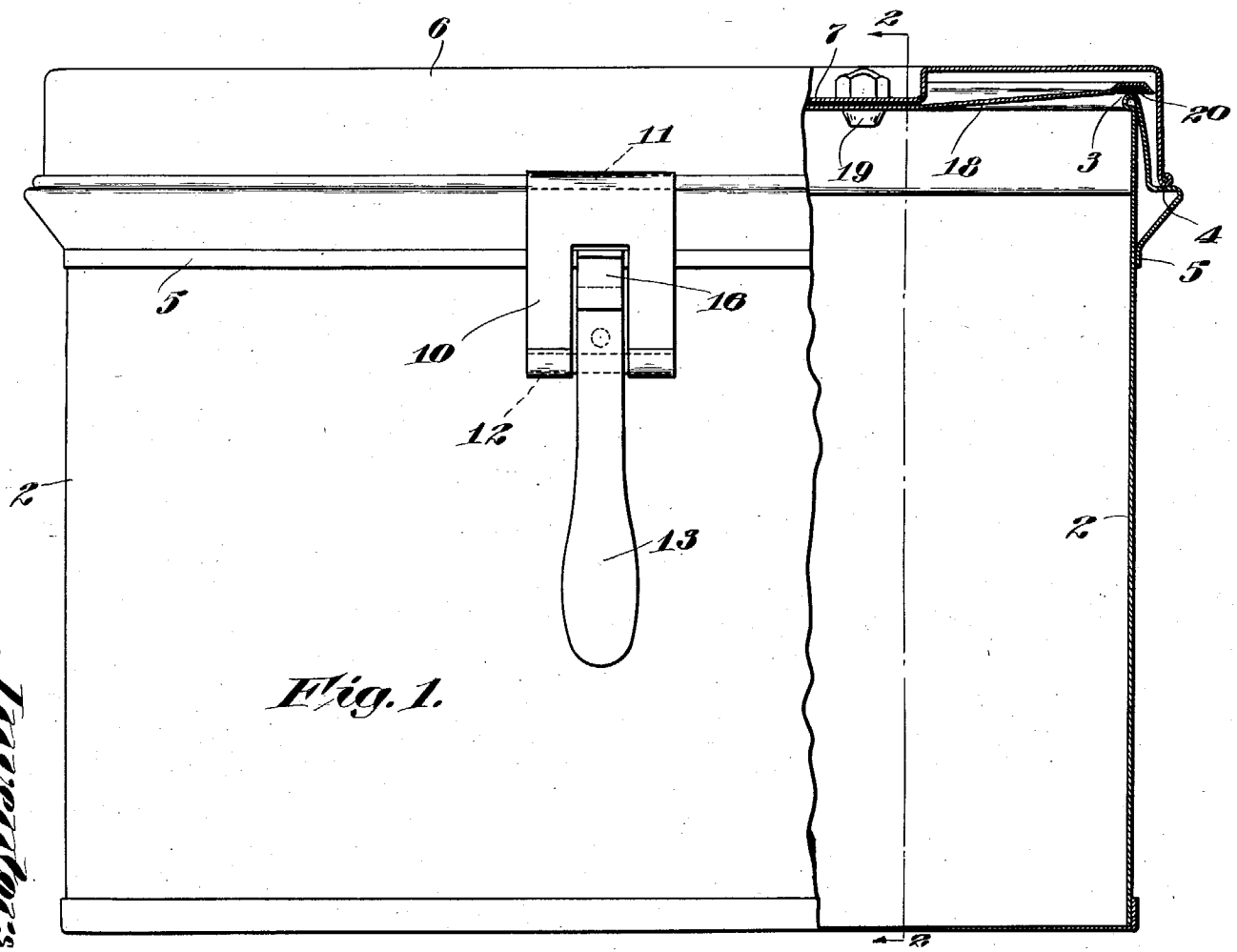

This invention relates to containers which are designed to be tightly closed, such as cans, boxes, trunks, vaults, and similar enclosures. In containers of this type as ordinarily made, and especially those having hinged covers, it is difficult to make an air tight closure at the opening in the container. At the same time such a closure is desired for many purposes, particularly when the container is to be used to store materials that would be injured by moisture, dust, vermin, etc., or which contain a volatile element that would escape unless the materials were kept in an absolutely tight enclosure. Such a container also is desirable for holding materials such, for instance, as tobacco, cigars, and the like, which should be kept in an atmosphere of relatively constant humidity.

With these considerations in view, it is the chief object of the present invention to devise a container of the general character indicated which will have an air tight closure that can be moved readily to open the container or to close and seal it again. It is also an object of the invention to devise an article of this general character which can be economically manufactured and which shall be of sturdy and substantial construction.

The nature of the invention will be readily understood from the following description when read in connection with the accompanying drawings, and the novel features will be particularly pointed out in the appended claims.

Figure 2:
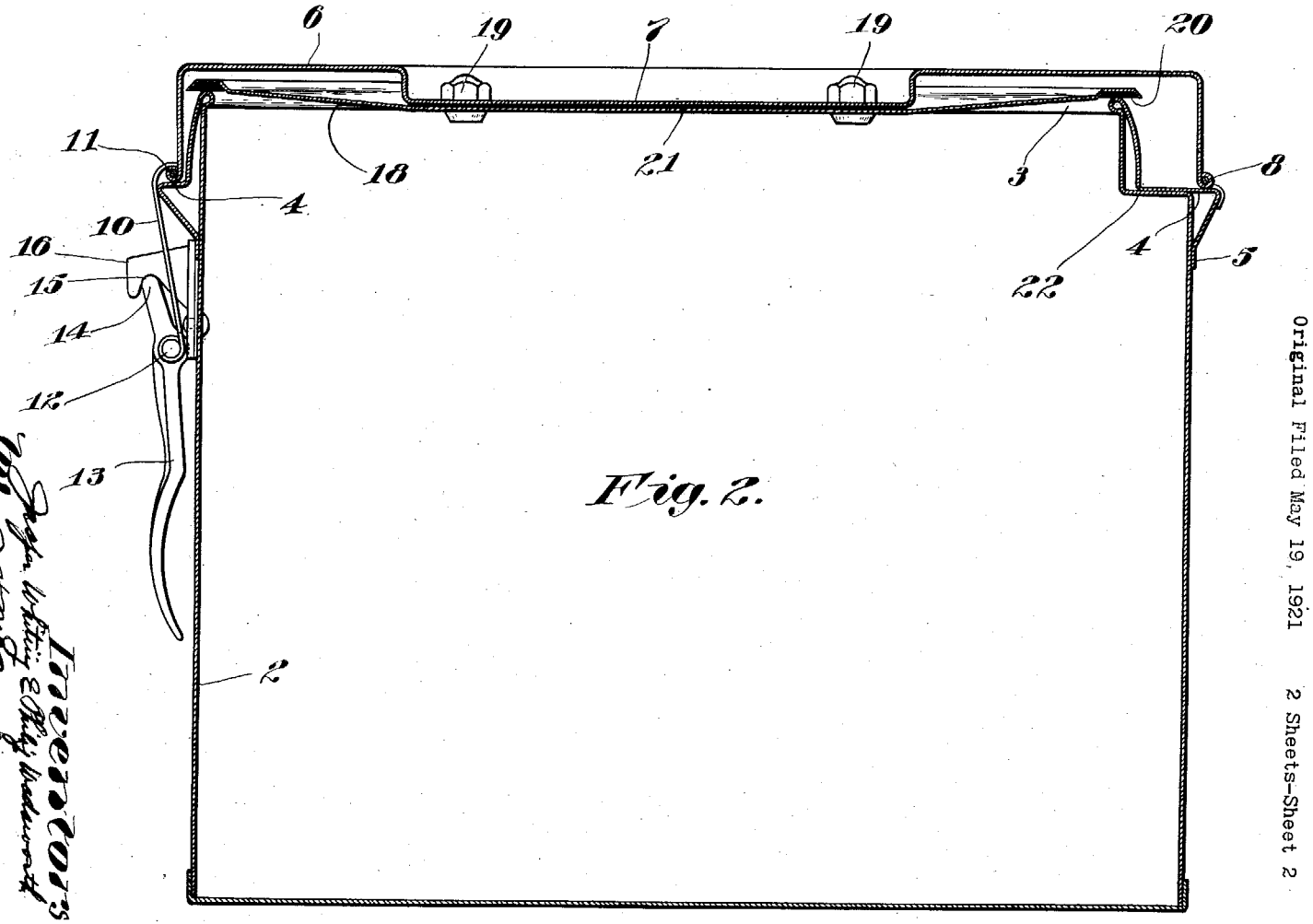

Referring now to the drawings:

Figure 1 is a view partly in front elevation and partly in vertical cross section, showing a container constructed in accordance with this invention; and Fig. 2 is a cross sectional view on the line 2—2, Fig. 1.

The construction shown comprises a sheet metal box, the lower or body portion of which is designated at 2. The upper part of each wall of this box is folded over, as indicated at 3, to form a horizontal shoulder 4. Below this shoulder the metal is bent toward the wall or side of the box and is soldered thereto at 5.

The cover 6 of the box is of the usual construction except that the central portion of the cover is preferably depressed as indicated at 7, and this cover is hinged to the rearward side of the box at 8, Fig. 2. When the cover is in its closed position the lower edge of its downwardly turned margin may rest on the external shoulder 4 of the box, and means is provided to draw this cover firmly down on the shoulder. In the construction shown a fastening means of the toggle type has been used for this purpose.

This fastening device comprises a U-shaped metal strap 10 pivoted to the front edge of the cover at 11, and also pivotally connected by means of a pin 12 to a handle or lever 13 having a point or toe 14 to enter a recess 15 formed in a bracket 16 that is riveted to the front of the box. This device is shown in Fig. 2 holding the cover in its closed position, and it will be seen that when the handle 13 is swung toward the left it will pivot on the point 14, thus causing the pin 12 to swing upwardly and thereby release the cover. A swinging movement of the handle in the opposite direction operates through these parts to exert a powerful closing movement on the cover. No novelty, however, is claimed in this particular fastening means and it may be replaced by any other suitable fastening device.

It will be observed that the cover 6 does not close the top of the box tightly, and for the purpose of performing this function a closure plate or inner cover 18, preferably made of resilient material such as sheet steel or brass, is secured to the central depressed portion 7 of the cover 6 by means of bolts 19—19. When the cover is closed the margin of this plate 18 overlies the edge 3 of the open top of the container and this marginal part is preferably grooved to receive a gasket 20 made of rubber, cork, or any other suitable material. This gasket preferably is cemented in the groove in the margin of the plate 18. The heads of the bolts 19—19 are soldered to the plate 18 or tight joints are formed between these bolts and the plate in some other suitable manner.

It will now be evident that when the cover 6 is swung down into its closed position, the gasket 20 will engage the edge 3 at the top of the container or box 2 just before the cover reaches its lowermost or completely closed position. The elasticity of the plate 18 and the cover 6 will resist yieldingly the continuation of the closing movement of the cover, and as this movement is completed the marginal portion of the closure plate 18 will be sprung upwardly, as shown in the drawings, thus causing the plate to press the gasket 20 firmly against the upper edge 3 of the container and thereby make an air tight joint at this edge. If the cover 6 is made of resilient material, both the resiliency of this part and also that of the plate 18 will be utilized in pressing the gasket 20 firmly against the edge 3.

It will be seen that the depression of the central portion 7 of the cover provides ample space for the yielding movement of the plate 18 and the depth of this depression or offset may be made such that it will be impossible to spring the plate 18 far enough to permanently distort it. One or more shims 21 may be placed between the plate 18 and the depressed portion 7 of the cover to increase the range of movement of the marginal portion of the closure plate if desired. It will also be observed that the rearward edge of the opening in the top of the box is set inwardly by reason of the offset 22, Fig. 2, and that, due to this construction and the position of the hinge 8 relatively to the adjacent part of the edge 3, the gasket 20 will come into contact substantially simultaneously with all parts of the edge 3 so that an approximately uniform flexure of the entire margin of the plate is produced.

It is to be noted that the outer cover 6 has a down-turned flange somewhat larger than the opening in the container defined by the fold or bead 3. Hence, the container opening 3 extends upwardly into the flange, and an annular space exists between the flange and container so that the cover or cap 6 is readily moved up and down for opening and closing the container. Of further importance is the fact that the inner cover 18 is formed from an imperforate flat sheet of resilient metal and comprises a flexible disk-like member with its gasket means 20 carried therewith, and the downwardly directed flange of the outer cover 6 embraces and protects this inner cover sealing member 18, 20. The central portion of the inner cover 18 is held to the outside cover 6 which leaves the peripheral portion of said inner cover 18 and its gasket 20 free to exert a resilient pressure for evenly seating the gasket upon and all the way around the container opening 3, thereby providing a sealed fit over said opening.

The opening at the top of the container 2, as defined by the fold or edge 3, forms an uppermost single rim against which the gasket 20 engages by reason of the peripheral or marginal pressure of the resilient inner cover 18 made of sheet steel or brass. Note also the importance of a sufficient marginal or peripheral distance or annular area to impart resiliency at said marginal portion of the inner cover 18 where the latter evenly engages and seals against the opening 2. Furthermore, the gasket 20 is carried with and forms a unitary part of the cover structure so as to raise and lower therewith. Another feature of this container-cover resides in the smooth outer surface of the cover 6 which is more or less flat and forms a plain surface free of projections. And the down-turned marginal flange of the outer cap 6 forms a drain which prevents moisture or drops of water from getting up into the gasket 20 and the inner resilient cover 18 which backs the gasket. Also the outer cap 6 is solid or closed, and hence it is moisture proof from the top.

This invention thus provides a closure construction for containers and enclosures which is of very simple form, is economical to manufacture, and is very effective. The invention considered in its broader aspects may be embodied in many forms, each having its own advantages. For instance, the closure may be substantially rigid and be yieldingly held in its closed position, the resiliency of the cover being depended upon for this action, or, the closure itself may be resilient and the cover or other supporting means therefor may be rigid. In other constructions, also, both the closure and its support may be resilient. In some constructions the closure and cover may have a certain portion or portions in common. That is, the closure may consist of a marginal strip shaped to fit over the edge of the opening in the container and the central portion of the closure may be formed by the cover itself. The invention thus may be variously modified and the design used in any individual case will necessarily be controlled as to some particulars by the nature of the container on which the closure is used.

What is claimed as new is:

1. A container having an opening therein, a hinged outer cover for said opening, an inner cover attached to and abutting said outer cover within the marginal portion of the inner cover but leaving its marginal portion spaced therefrom, one of said covers being resilient, and means for holding said outer cover in its closed position with said inner cover closing said opening.

2. A container having an opening therein, a hinged outer cover for said opening, a resilient inner cover attached to and abutting said outer cover within the marginal portion of the inner cover but leaving said marginal portion spaced therefrom, and means for holding said outer cover in its closed position with said inner cover closing said opening.

3. A container having an opening therein, an outer cover for said opening, and an inner cover attached to and abutting said outer cover within the marginal portion of the inner cover but leaving said marginal portion spaced therefrom, one of said covers being resilient, said marginal portion being adapted to make a sealing contact with the edges of the opening when the outer cover is closed, and said outer cover being hinged to the container on a line offset laterally from the edge of the opening so as to produce an approximately uniform pressure on all the marginal portion of the inner cover when the outer cover is closed.

4. A container having an opening therein, an outer cover for said opening, a resilient inner cover having its margin spaced from said outer cover and being attached to and abutting said outer cover within said margin, said outer cover being hinged to the container on a line laterally offset from the edge of the opening.

5. A container having an open top, an outer cover hinged to said container to swing into either an open or closed position, a resilient inner cover for closing said open top, said outer cover having a depressed central part attached to and abutting said inner cover within the marginal portion of the latter, said marginal portion being free to yield toward said outer cover, and means for holding said outer cover in its closed position, whereby the marginal portion of said inner cover is held yieldingly against the edge of said top.

6. A container having an opening therein, an outer cover for said opening, said outer cover having a downwardly directed peripheral flange larger than the opening adapted to be received up into the flange without sealing said opening, a peripheral clearance existing between the flange and the container, an inner cover attached to and abutting said outer cover within the marginal portion of the inner cover but leaving said marginal portion spaced therefrom a sufficient marginal distance to impart resiliency at said marginal portion, said inner cover comprising a flat metallic plate carried within the flange of the outer cover, gasket means carried by the covers as a unitary part therewith and also embraced within the flange, one of said covers being resilient, and means for holding said outer cover in its closed position with said inner cover closing said opening, and the inner cover serving to resiliently bear the gasket means in sealing engagement against the periphery of the opening.

7. A container having an opening therein, an outer cover for said opening, said outer cover having a flange of depending marginal form larger than the container portion having said opening, the flange being adapted to fit down over the container portion without engagement therewith and thereby covering but not sealing said opening, a resilient inner cover attached to and abutting said outer cover within the marginal portion of the inner cover but leaving said marginal portion spaced therefrom a sufficient marginal distance to impart resiliency at said marginal portion, said inner cover comprising a metallic plate means embraced within the flange, with the peripheral portion of said metallic plate means resiliently free within the flange to flex relatively to said outer cover, and means for holding said outer cover in its closed position with said inner cover closing said opening, by maintaining said outer cover over the container opening with a clearance space between the flange and container portion, whereby said outer cover is free to move up and down relatively to the container portion to open and close the container.

8. A container having an opening therein, said opening being defined by an uppermost single rim rising above the container and adapted to be engaged by a cover, an outer cover for said opening resting over the uppermost rim without engagement therewith, the outer cover having a downwardly-directed peripheral flange larger than the opening adapted to be received up into said cover and within its flange without sealing said opening, whereby said downwardly-directed flange has peripheral clearance with the container so as to avoid side engagement therewith, an inner cover attached to and abutting said outer cover within the marginal portion of the inner cover but leaving said marginal portion spaced therefrom a sufficient marginal distance to impart resiliency at said marginal portion, said inner cover comprising an imperforate flat metallic plate carried within the downwardly-directed flange of the outer cover, gasket means carried by the covers as a unitary part therewith and also embraced within and protected by the downwardly-directed flange, one of said covers being resilient, and means for holding said outer cover in its closed position with said inner cover closing said opening, and the inner cover plate serving to resiliently and evenly bear the gasket means in sealing engagement against the single uppermost rim forming the opening.

9. A container having an opening therein, an outer cover for said opening, said outer cover having a flange of depending peripheral form larger than the container portion having said opening, thereby adapting the depending flange to fit down over the container portion without engagement therewith and thusly providing a peripheral clearance between said depending flange and said container portion, a resilient inner cover attached to and abutting said outer cover within the marginal portion of the inner cover but leaving said marginal portion spaced therefrom a sufficient marginal distance to impart resiliency at said marginal portion, said inner cover comprising a metallic plate means embraced within the depending flange and protected thereby, with the peripheral portion of said metallic plate means resiliently free within the depending flange to flex relatively to said outer cover, and means for holding said outer cover in its closed position with said inner cover closing said opening, said outer cover adapted to be moved up and down relatively to the container portion to open and close said container, and means forming a part of the two assembled covers providing an outer surface free of upstanding or projecting parts.

JASPER WHITING.
PHILIP WADSWORTH.